(12) United States Patent
Chacho

(10) Patent No.: US 8,462,131 B2
(45) Date of Patent: Jun. 11, 2013

(54) ELECTRONIC DEVICE HAVING VIRTUAL KEYBOARD WITH PREDICTIVE KEY AND RELATED METHODS

(76) Inventor: John Chacho, Ocala, FL (US)

(*) Notice: Subject to any disclaimer, the term of this patent is extended or adjusted under 35 U.S.C. 154(b) by 187 days.

(21) Appl. No.: 13/166,434

(22) Filed: Jun. 22, 2011

(65) Prior Publication Data

US 2011/0316800 A1 Dec. 29, 2011

Related U.S. Application Data

(60) Provisional application No. 61/357,751, filed on Jun. 23, 2010.

(51) Int. Cl.
*G06F 3/041* (2006.01)
(52) U.S. Cl.
USPC ........................................................ 345/173
(58) Field of Classification Search
USPC ............ 345/156, 168, 169, 172, 173; 341/22; 382/230; 708/142
See application file for complete search history.

(56) References Cited

U.S. PATENT DOCUMENTS

| | | | | |
|---|---|---|---|---|
| 5,953,541 A * | 9/1999 | King et al. | | 710/67 |
| 5,963,671 A | 10/1999 | Comerford et al. | | 382/230 |
| 6,011,554 A * | 1/2000 | King et al. | | 715/811 |
| 7,658,562 B2 | 2/2010 | Suess | | 400/486 |
| 7,800,587 B2 * | 9/2010 | Kato | | 345/168 |
| 8,327,296 B2 * | 12/2012 | Arscott et al. | | 715/863 |
| 8,381,119 B2 * | 2/2013 | Yeh et al. | | 715/773 |
| 2005/0017955 A1 * | 1/2005 | Jayachandra | | 345/171 |
| 2006/0274051 A1 * | 12/2006 | Longe et al. | | 345/173 |
| 2008/0082934 A1 * | 4/2008 | Kocienda et al. | | 715/773 |
| 2009/0199092 A1 * | 8/2009 | Ghassabian | | 715/261 |
| 2009/0273567 A1 | 11/2009 | Milley et al. | | 345/169 |
| 2010/0060585 A1 * | 3/2010 | Chiu | | 345/168 |
| 2010/0182242 A1 * | 7/2010 | Fields et al. | | 345/169 |
| 2010/0281268 A1 * | 11/2010 | Barreto et al. | | 713/182 |
| 2010/0309133 A1 * | 12/2010 | Gellersen et al. | | 345/168 |
| 2011/0050575 A1 * | 3/2011 | Krahenbuhl et al. | | 345/168 |

* cited by examiner

*Primary Examiner* — Joe H Cheng
(74) *Attorney, Agent, or Firm* — Allen, Dyer, Doppelt, Milbrath & Gilchrist, P.A.

(57) ABSTRACT

An electronic device may include a housing, a touch screen display carried by the housing, and a processor being carried by the housing and cooperating with the touch screen display. The processor may be for operating a virtual keyboard on the touch screen display for receiving textual input from a user. The virtual keyboard may include keys with at least one remappable key with a set position in the virtual keyboard. The processor may selectively assign a predicted key value to the at least one remappable key based upon prior textual input.

19 Claims, 3 Drawing Sheets

ELECTRONIC DEVICE HAVING VIRTUAL KEYBOARD WITH PREDICTIVE KEY AND RELATED METHODS

RELATED APPLICATION

This application claims priority to U.S. Provisional Patent Application Ser. No. 61/357,751, which was filed on Jun. 23, 2010, the contents of which are hereby incorporated by reference in their entirety.

FIELD OF THE INVENTION

The present invention relates to the field of electronic devices, and, more particularly, to electronic devices with virtual keyboards and related methods.

BACKGROUND OF THE INVENTION

The typical computing device includes a processor, a display cooperating with the processor for providing a graphical user interface for the user, and an input device for receiving input from the user. The most common input devices are the ubiquitous combination of the keyboard and mouse. Nevertheless, in mobile applications, the keyboard and mouse approach may not be practical due to size constraints. Accordingly, many mobile computing devices include only a keyboard, which is typically miniaturized.

Although the typical miniaturized keyboard does provide a more compact form factor, it may be desirable to remove even a miniaturized physical keyboard in some applications. For example, the space used for the miniaturized physical keyboard could be used to expand the size of the display or to further reduce the size of the device. One approach at replacing the typical miniaturized physical keyboard is the virtual keyboard. In devices including a touch screen display, the virtual keyboard is presented to the user on the screen. The user taps virtual keys on the virtual keyboard to provide input to the device, thereby mimicking the physical keyboard.

The typical virtual keyboard includes multiple keyboard modes, more specifically, a primary mode including letters and the most common punctuation marks, i.e. commas and periods; a numeric mode including numbers and certain special characters; and a symbol mode including any remaining special characters and marks. A potential drawback to this approach may be when the user needs to input a special character or punctuation mark not included in the primary mode. In these instances, the user must switch the keyboard mode to the desired mode for inputting the special character and then back to the primary mode to complete the input. Of course, this may slow down the input process and frustrate the user.

One approach is disclosed in U.S. Patent Application Publication No. 2009/0273567 to Milley et al., which discloses a virtual keyboard. This virtual keyboard includes a rotating punctuation mark key. In particular, the key includes a plurality of potential punctuation marks, the assigned punctuation mark is changeable based upon the user pressing a shift key. Accordingly, the user can reassign this punctuation mark key by repetitively pressing the sift button.

Another typical approach is to provide a new interface window separate from the virtual keyboard with a plurality of potential punctuation marks. A drawback to this approach may include reduced display real estate, since the new window is displayed in addition to the virtual keyboard, and reduced ergonomic efficiency since the user must now access another portion of the screen.

SUMMARY OF THE INVENTION

In view of the foregoing background, it is therefore an object of the present invention to provide a virtual keyboard with a more efficient input method.

This and other objects, features, and advantages in accordance with the present invention are provided by an electronic device that may comprise a housing, a touch screen display carried by the housing, and a processor being carried by the housing and cooperating with the touch screen display. The processor may operate a virtual keyboard on the touch screen display for receiving textual input from a user, the virtual keyboard comprising a plurality of keys with at least one remappable key with a set position in the virtual keyboard, and selectively assign a predicted key value to the at least one remappable key based upon prior textual input. Advantageously, the user is not subject to additional steps to access special keyboard characters.

More specifically, the processor may operate the virtual keyboard in a first mode where the plurality of keys comprises a plurality of letter character keys, and in a second mode where the plurality of keys comprises a plurality of numeric keys. The at least one remappable key may comprise at least one remappable punctuation mark key.

For example, the processor may receive the prior textual input comprising a first mark from a punctuation mark pair, and may selectively map the at least one remappable punctuation mark key to a second mark from the punctuation mark pair. The punctuation mark pair may comprise at least one of a pair of bracket marks, a pair of quotation marks, and a pair of parentheses marks.

In some embodiments, the processor may continuously selectively assign the at least one remappable key during the textual input. The processor may receive the prior textual input comprising an interrogative phrase, and may selectively map the at least one remappable key to a question mark key.

For example, the processor may operate the virtual keyboard comprising a spacebar key, and the set position may be adjacent the spacebar key. The processor may also operate the virtual keyboard comprising a plurality of remappable keys.

Another aspect is directed to a method for operating an electronic device. The method may comprise operating a virtual keyboard on a touch screen display in the electronic device for receiving textual input from a user, the virtual keyboard comprising a plurality of keys with at least one remappable key with a set position in the virtual keyboard. The method may further include selectively assigning a predicted key value to the at least one remappable key based upon prior textual input.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
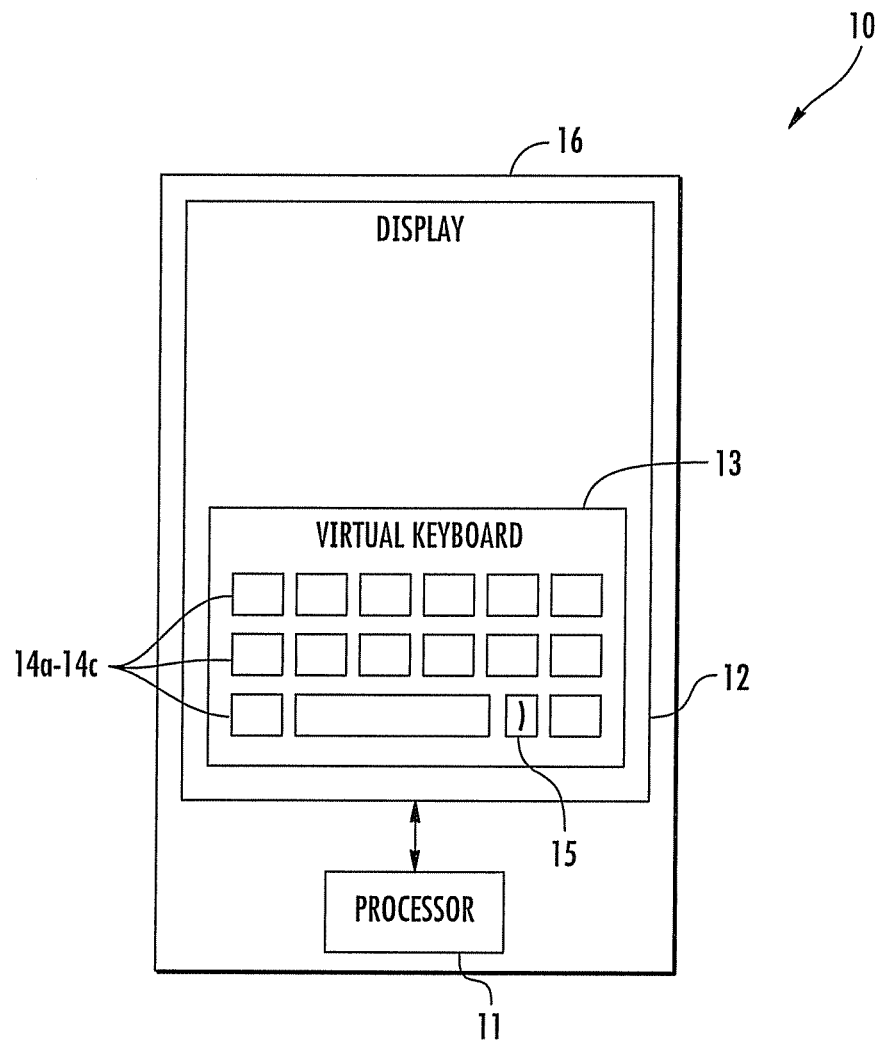
FIG. 1 is a schematic diagram of an electronic device according to the present invention.
Figure 2A:
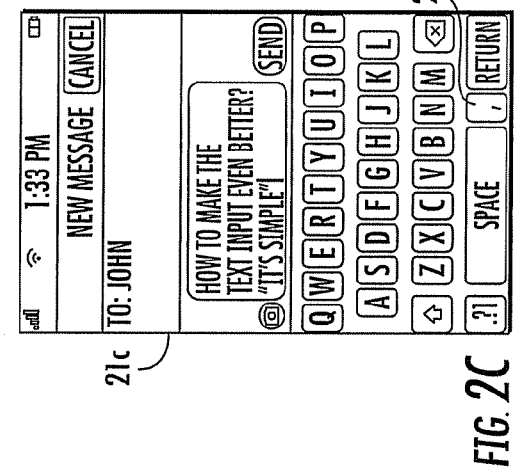
FIGS. 2A-2F are successive screenshots from another embodiment of the electronic device according to the present invention.
Figure 2B:
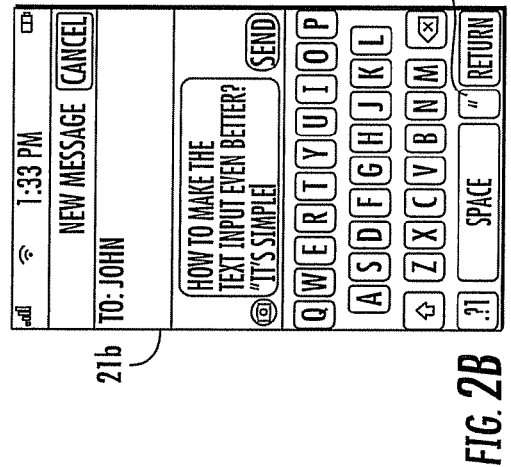
Figure 2C:
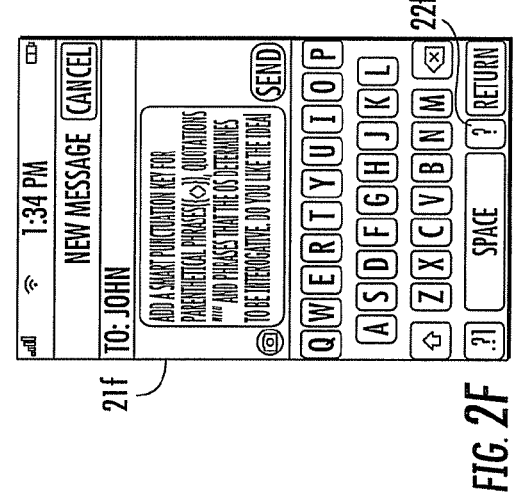
Figure 2D:
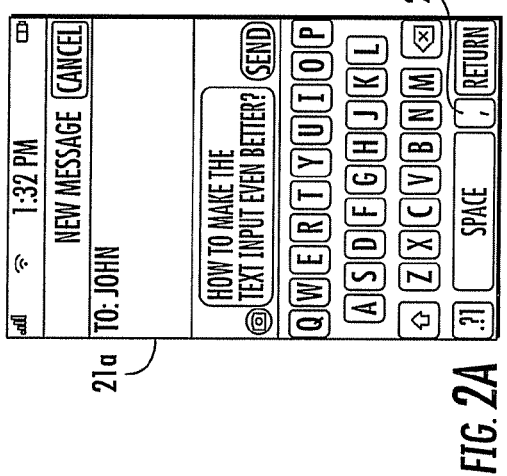
Figure 2E:
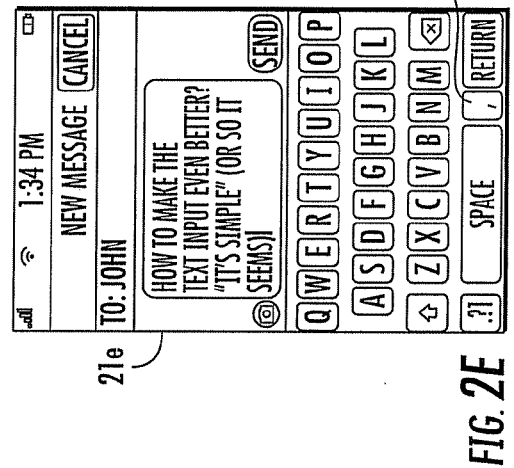
Figure 2F:
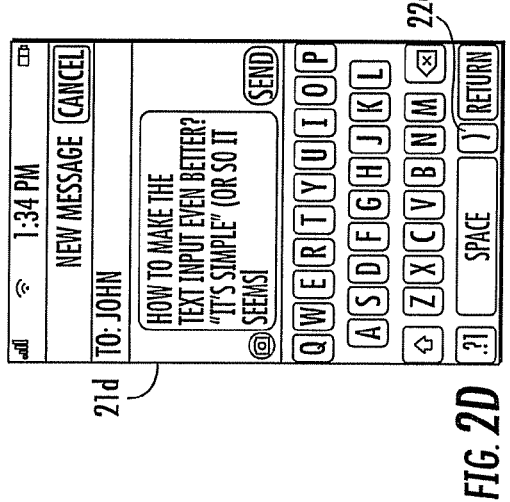

Referring to FIG. 1, an electronic device 10 according to the present invention is now described. The electronic device 10 illustratively includes a housing 16, a display 12 carried by the housing, and a processor 11 being carried by the housing and configured to cooperate with the display. For example, the display 12 illustratively comprises a touch screen display (capacitive, thermal, etc.). The processor 11 is illustratively configured to provide a virtual keyboard 13 on the touch screen display 12 for receiving input from a user. The electronic device 10 may comprise, for example, a mobile wireless communications device, a tablet-type processing device, or any other virtual keyboard using device. Although the illustrated embodiment includes the touch screen display 12, in other embodiments, the display may be non-touch sensitive and receive user key selection on the virtual keyboard 13 via other devices, for example, a track ball or a pointing device.

The processor 11 is illustratively configured to operate the virtual keyboard 13 in a plurality of modes. For example, the plurality of modes may comprise a first mode for displaying letter keys 14a-14c, i.e. this mode displays all or substantially all the letters of the applicable language (English: A-Z). This first mode of the virtual keyboard 13 may also include common punctuation marks, for example, the period and comma. The processor 11 is illustratively configured to operate the virtual keyboard 13 in a second mode for displaying numeric keys, i.e. to provide the functionality of the typical physical numeric keypad.

The processor 11 is illustratively configured to display the virtual keyboard 13, while in the first mode, comprising a remappable key 15 with a set position and being selectively assigned to a predicted key value based upon prior text input. In the illustrated embodiment, the remappable key 15 is located in the bottom right side of the virtual keyboard 13, adjacent the space bar. As will be appreciated by those skilled in the art, the remappable key 15 can be located in other positions. Nevertheless, during operation, the remappable key 15 remains in static placement to permit the user to become accustomed to it, thereby increasing ease and efficiency of use. Additionally, the processor 11 is configured to continuously selectively assign the at least one remappable key 15 during user input, i.e as the user provides textual input to the processor 11, the remappable key 15 is being constantly reassigned based upon heuristic calculations for likely special characters.

In other words, the processor 11 receives and processes the virtual keyboard 13 input from the user and uses it to predict a special character key most likely to be needed and presents it to the user on the remappable key 15. Accordingly, instead of the user having to access an awkward typical special character keypad (second mode) to type in the character, the user is presented with the needed special character automatically via the remappable key 15.

In the illustrated embodiment, the remappable key 15 is a remappable punctuation mark key, shown as a closed parentheses mark key (FIG. 1). But as will be appreciated by those skilled in the art, when the prior text input includes a first mark from a punctuation mark pair, the processor 11 is illustratively configured to selectively map the remappable punctuation mark key 15 to a second mark from the punctuation mark pair. For example, the punctuation mark pair comprises at least one of a pair of parentheses, a pair of quotation marks, and a pair of brackets. Moreover, when the prior text input includes an interrogative phrase, the processor 11 is illustratively configured to selectively map the remappable punctuation mark key 15 to a question mark key. For example, the processor 11 looks for certain interrogative words, for example, "how", "why", "which", "what", "when", "who", "do you", "do they", "does he", and "does she", etc. Of course, if the processor cannot predict a most likely needed key to map to the remappable key 15, the processor can default to a typical punctuation mark, for example, a period or a comma.

In other embodiments (not shown), the remappable key 15 may comprise at least one remappable numeric character key, i.e. being remappable to certain numbers when the processor predicts their usage. Also, in yet other embodiments, the processor 11 may be configured to provide the virtual keyboard comprising a plurality of remappable keys.

In some embodiments, the processor 11 may assign the remappable key 15 to a predicted key value comprising a textual phrase, i.e. a string of characters. For example, if the prior textual input comprises a text string associated with a web domain, the predicted key value may comprise ".com".

Referring now to FIGS. 2A-2E, several successive screen shots 21a-21f from the display of another embodiment of the electronic device are now described. In this embodiment, the virtual keyboard displays a full Qwerty keyboard. The successive screen shots 21a-21f include the remappable key 22a-22f and show how it switches between potential punctuation marks based upon the prior text input, switching from the default comma mark 22a, 22c, 22e to the closed quotation mark 22b, the closed parentheses 22d, and the question mark 22f. In other words, the remappable key 22a-22f changes its appearance to the remapped value continuously during user input. As perhaps best seen in FIGS. 2A-2F, the remappable key 22a-22f is redrawn in real time as the user types to have the newly assigned key value thereon.

Figure 3:
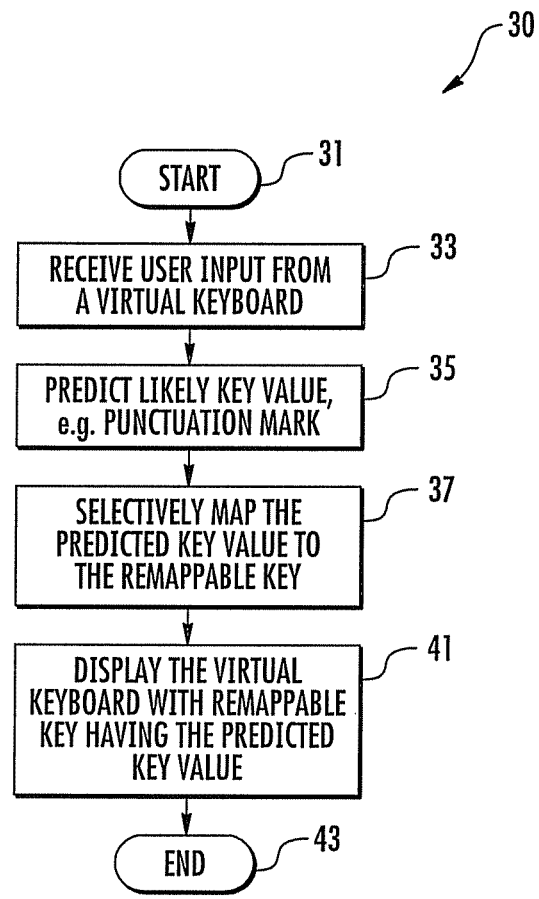
FIG. 3 is a flowchart illustrating operation of the electronic device of FIG. 1.

Referring now additionally to FIG. 3, a flowchart 30 describes another aspect directed to a method of providing a virtual keyboard 13 on an electronic device 10. After the start (Block 31), the method may include providing the virtual keyboard 13 for receiving input from a user (Block 33), and operating the virtual keyboard in a plurality of modes comprising a first mode displaying letter keys, and a second mode displaying numeric keys. As the processor 11 is receiving the textual input from the user, the processor generates a most likely key value from the special characters and phrases in all operating modes for the virtual keyboard (Block 35). The processor 11 then assigns the predicted key value to the remappable key (Block 37). The method may further include displaying the virtual keyboard in the first mode comprising at least one remappable key 15 with a set position and being selectively assigned to a predicted key value based upon prior text input (Blocks 41 & 43).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a housing;
   a touch screen display carried by said housing; and
   a processor being carried by said housing and cooperating with said touch screen display for operating a virtual keyboard on said touch screen display for receiving textual input from a user, the virtual keyboard comprising a plurality of keys with at least one remappable key with a set position in the virtual keyboard, and selectively assigning a predicted key value to the at least one remappable key based upon prior textual input.

2. The electronic device of claim 1 wherein said processor operates the virtual keyboard in a first mode where the plurality of keys comprises a plurality of letter character keys, and in a second mode where the plurality of keys comprises a plurality of numeric keys.

3. The electronic device of claim 1 wherein the at least one remappable key comprises at least one remappable punctuation mark key.

4. The electronic device of claim 3 wherein said processor receives the prior textual input comprising a first mark from a punctuation mark pair, and selectively maps the at least one remappable punctuation mark key to a second mark from the punctuation mark pair.

5. The electronic device of claim 4 wherein the punctuation mark pair comprises at least one of a pair of bracket marks, a pair of quotation marks, and a pair of parentheses marks.

6. The electronic device of claim 1 wherein said processor continuously selectively assigns the at least one remappable key during the textual input.

7. The electronic device of claim 1 wherein said processor receives the prior textual input comprising an interrogative phrase, and selectively maps the at least one remappable key to a question mark key.

8. The electronic device of claim 1 wherein said processor operates the virtual keyboard comprising a spacebar key; and wherein the set position is adjacent the spacebar key.

9. An electronic device comprising:
a housing;
a touch screen display carried by said housing; and
a processor being carried by said housing and cooperating with said touch screen display for
operating a virtual keyboard on said touch screen display for receiving textual input from a user, the virtual keyboard comprising a plurality of keys with at least one remappable punctuation mark key with a set position in the virtual keyboard, and
selectively continuously assigning a predicted key value to the at least one remappable punctuation mark key based upon prior textual input.

10. The electronic device of claim 9 wherein said processor operates the virtual keyboard in a first mode where the plurality of keys comprises a plurality of letter character keys, and in a second mode where the plurality of keys comprises a plurality of numeric keys.

11. The electronic device of claim 9 wherein said processor receives the prior textual input comprising a first mark from a punctuation mark pair, and selectively maps the at least one remappable punctuation mark key to a second mark from the punctuation mark pair.

12. The electronic device of claim 11 wherein the punctuation mark pair comprises at least one of a pair of bracket marks, a pair of quotation marks, and a pair of parentheses marks.

13. The electronic device of claim 9 wherein said processor receives the prior textual input comprising an interrogative phrase, and selectively maps the at least one remappable punctuation mark key to a question mark key.

14. The electronic device of claim 9 wherein said processor operates the virtual keyboard comprising a spacebar key; and wherein the set position is adjacent the spacebar key.

15. A method for operating an electronic device comprising:
operating a virtual keyboard on a touch screen display in the electronic device for receiving textual input from a user, the virtual keyboard comprising a plurality of keys with at least one remappable key with a set position in the virtual keyboard; and
selectively assigning a predicted key value to the at least one remappable key based upon prior textual input.

16. The method of claim 15 further comprising operating the virtual keyboard in a first mode where the plurality of keys comprises a plurality of letter character keys, and in a second mode where the plurality of keys comprises a plurality of numeric keys.

17. The method of claim 15 wherein the at least one remappable key comprises at least one remappable punctuation mark key.

18. The method of claim 17 further comprising receiving the prior textual input comprising a first mark from a punctuation mark pair, and selectively mapping the at least one remappable punctuation mark key to a second mark from the punctuation mark pair.

19. The method of claim 15 further comprising continuously selectively assigning the at least one remappable key during the textual input.

\* \* \* \* \*